Dec. 11, 1951 L. E. BLISS 2,578,282
PROTECTIVE LAYER FOR FINISHED PHOTOGRAPHIC FILM
Filed July 9, 1946
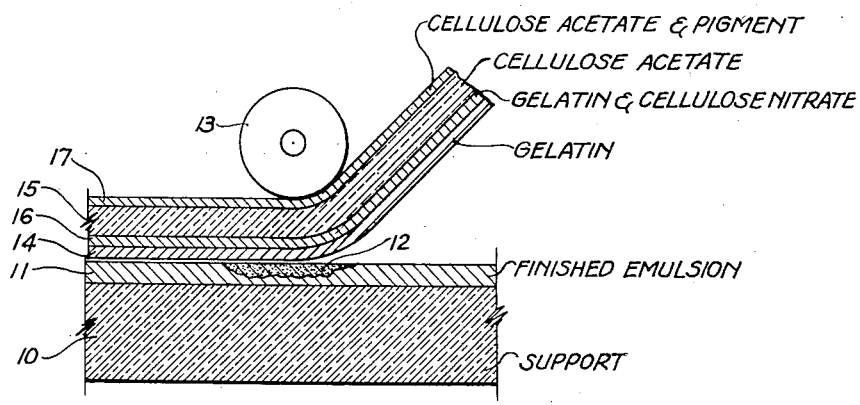
Lester E. Bliss
INVENTOR
BY
ATTORNEYS Patented Dec. 11, 1951

2,578,282

UNITED STATES PATENT OFFICE 2,578,282

PROTECTIVE LAYER FOR FINISHED PHOTOGRAPHIC FILM

Lester E. Bliss, Rochester, N. Y., assignor to Eastman Kodak Company, Rochester, N. Y., a corporation of New Jersey Application July 9, 1946, Serial No. 682,273

3 Claims. (Cl. 95—1)

This invention relates to a finished photographic element and particularly to a protective layer for such element.

Various materials such as gelatin, cellulose esters and synthetic resins have been used for applying to the emulsion surface of finished photographic film to protect the film from dirt, abrasion, finger marks, etc. Such protecting layers may be applied by coating the protecting material from solution or by applying it in sheet form by lamination to the emulsion surface. Such materials often produce a smooth surface which reflects incident light and is therefore objectionable upon viewing the photographic image.

It is therefore an object of my invention to provide a novel protective coating for finished photographic prints or transparencies. A further object is to provide a protective sheeting for such prints which may be applied by lamination and which will not be subject to spectral reflection of light from the surface of the protecting layer.

These objects are accomplished by providing the finished print with a laminated cellulosic sheeting having a layer of gelatin or other hydrophilic colloid which may be laminated to the photographic emulsion and a layer of colloidal material, preferably a cellulose ester, containing a matte or diffusing material. This dull or non-reflecting surface must not cause objectionable diffusion of light passing through the completed laminate but should contain sufficient diffusing material that it will prevent bright reflections from the surface of the protective sheeting. Preferably, the plain gelatin layer is on one side of cellulosic sheeting, and the cellulose ester or other layer containing the diffusing material is on the opposite side.

The accompanying drawing is a sectional view showing laminating the finished film according to my invention.

I have found that a suitable protective sheeting for laminating to finished photographic emulsions of gelatin or other hydrophilic material can be made by coating a cellulose ester sheet such as cellulose acetate sheeting of a thickness of 0.003 to 0.005 inch. To one side of this sheeting there is applied a layer of a mixture of gelatin and low viscosity cellulose nitrate. Over this subbing layer, there is applied a thin layer of gelatin which serves to laminate the sheeting to the photographic emulsion. The opposite side of the sheeting is coated with a layer containing a matting material, preferably a finely divided silicious material such as Peerless White Rouge (manufactured by Tamms Silica Co., 228 No. La- Salle St., Chicago, Illinois, Bentonite, a modified montmorillonite, sold by American Colloid Co., or Titanox.

My invention may be illustrated by the following example.

A cellulose acetate sheeting of 0.003" thickness is coated on one side with a mixture of gelatin and cellulose nitrate of the following composition:

|  | Percent |
| --- | --- |
| Gelatin | 1.25 |
| Cellulose Nitrate (30 to 100% soluble in ethyl alcohol, viscosity 2 to 5 seconds and nitrogen content about 11%) | 0.3 |
| Water | 3 |
| Acetone | 50 |
| Chromic chloride (percent of weight of gelatin) | 1.5 |
| Acetic acid | 1 |
| Methyl alcohol | 42.95 |

This coating is dried and a gelatin layer is applied from a solution of the following composition:

|  | Percent |
| --- | --- |
| Gelatin | 1.5 |
| Butyl alcohol | 10 |
| Methyl alcohol | 40 |
| Acetic acid | 1 |
| Water | 37.5 |

To provide the surface which lessens reflection on the opposite side of the sheet, I apply, preferably by means of a bead hopper, a mixture of low viscosity cellulose acetate and a finely divided silicious material, such as Peerless White Rouge dispersed in organic solvent. This mixture dries to form a layer of cellulose acetate having dispersed therein the finely divided silicious material to form a dull, semi-matte surface. This surface causes only moderate diffusion of light passing directly through the sheet, yet diffuses incident light so that no sharp images are formed by reflection. The following formula is suitable for preparation of the dull surface.

|  | Percent |
| --- | --- |
| Peerless White Rouge | 6.1 |
| Low-viscosity cellulose acetate | 4.9 |
| Methyl alcohol | 20 |
| Methyl Cellosolve | 10 |
| Acetone | 59 |

Instead of the finely divided silicious material or other pigment I may use in the diffusing layer a dispersion of a chlorinated diphenyl resin. These resins are described in "The Chemistry of Synthetic Resins" by Carleton Ellis, vol. II, pages 1142 to 1151, published by Reinhold Publishing Corporation (1935), and are available on the market under the name Aroclor. They are highly translucent and have a refractive index greater than 1.6 and vary in physical properties from liquids to solid resins at room temperature. Those that are solid are preferred for the purposes of my invention.

The chlorinated diphenyl resins are dispersed in aqueous gelatin solutions by first dissolving them in volatile solvents immiscible in water such as butyl acetate, toluene, butyl alcohol, or carbon tetrachloride. The solution of the resins is mixed with the gelatin solution and the mixture either run through a colloid mill, stirred vigorously, or shaken to disperse the resin solution. The volatile solvent is then removed from the dispersion by evaporation aided by heat and stirring or by heat and vacuum. After the removal of the volatile solvents the dispersion of the resin in the gelatin may be coated, chilled and dried in the normal manner. The following example illustrates the preparation of a dispersion of a chlorinated diphenyl resin for use according to my invention.

130 grams of gelatin are dissolved in water and made up to one liter. 10 grams of chlorinated diphenyl resin (for example Aroclor 1264) having high transparency and which has a "pour point" of about 40° to 60° C. are dissolved in 40 cc. of butyl acetate and added to the gelatin solution. The mixture is shaken vigorously until the resin solution is well dispersed. It is then heated in a water bath with stirring until the volatile solvent is removed. This dispersion is coated and dried in the usual manner.

In the accompanying drawing, I have shown a method of applying the protective sheeting used according to my invention. As shown therein, a finished photographic element comprising a support 10 of paper, cellulose ester plastic composition or glass, has thereon a finished emulsion layer 11 containing a developed and fixed silver image 12. The protective sheeting of my invention is applied to the emulsion layer 11 by laminating with a pressure roll 13 or by other suitable means after wetting with a dilute solution of ammonia in water either the finished emulsion layer 11 or the gelatin layer 14 of the protective sheeting or both. The protective sheeting as described above consists of a support layer 15 on which there is a subbing layer of gelatin and cellulose nitrate 16 and a thin gelatin layer 14 which serves to laminate the structure to the finished emulsion. The opposite side of layer 15 carries the layer 17 of cellulose acetate and a pigment which produces a matte or diffusing surface.

It will be understood that the examples and modifications included herein are illustrative only and that other materials can be used for producing the matte surface such as barium sulfate or other inorganic pigments.

I claim:

1. A finished photographic element comprising a support having thereon a photographic emulsion layer containing a visible image, and laminated over said emulsion layer, a transparent protective sheet comprising a cellulose ester support having on one side thereof a gelatin layer, and on the opposite side thereof a layer of cellulose ester containing a substantially colorless finely-divided pigment, said gelatin layer being secured to said emulsion layer.

2. A finished photographic element comprising a support having thereon a gelatin emulsion layer containing a silver image and laminated to said emulsion layer a transparent protective sheet comprising a cellulose acetate support having on one side thereof a layer of a mixture of gelatin and cellulose nitrate followed by a gelatin layer and on the opposite side thereof a layer of cellulose acetate containing a finely-divided silicious pigment, said gelatin layer being secured to said emulsion layer.

3. A finished photographic element comprising a support having thereon a gelatin emulsion layer containing a silver image and laminated to said emulsion layer a light-transmitting protective sheet comprising a cellulose acetate support having on one side thereof a gelatin layer, and on the opposite side thereof a layer of gelatin containing finely-divided particles of a chlorinated diphenyl resin, said gelatin layer being secured to said emulsion layer.

LESTER E. BLISS.

REFERENCES CITED

The following references are of record in the file of this patent:

UNITED STATES PATENTS

| Number | Name | Date |
|---|---|---|
| 1,649,756 | Thornton | Nov. 15, 1927 |
| 1,670,672 | Thornton | May 22, 1928 |
| 1,961,348 | Goedtler | June 5, 1934 |
| 2,054,284 | Forstmann | Sept. 15, 1936 |
| 2,083,640 | Couch et al. | June 15, 1937 |
| 2,146,907 | Nadeau | Feb. 14, 1939 |
| 2,259,009 | Talbot | Oct. 14, 1941 |
| 2,322,037 | Lindquist | June 15, 1943 |
| 2,324,105 | Nadian et al. | July 13, 1943 |
| 2,338,664 | Nadeau | Jan. 4, 1944 |